United States Patent
Burton et al.

(10) Patent No.: US 6,393,535 B1
(45) Date of Patent: May 21, 2002

(54) METHOD, SYSTEM, AND PROGRAM FOR MODIFYING PREFERRED PATH ASSIGNMENTS TO A STORAGE DEVICE

(75) Inventors: David Alan Burton, Vail; Robert Louis Morton, Tucson, both of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,685

(22) Filed: May 2, 2000

(51) Int. Cl.[7] ............................................... G06F 12/02
(52) U.S. Cl. ....................................... 711/158; 711/154
(58) Field of Search ................................. 711/154, 158

(56) References Cited

U.S. PATENT DOCUMENTS

| | | | |
|---|---|---|---|
| 4,490,785 A | 12/1984 | Strecker et al. | 710/100 |
| 4,654,778 A | 3/1987 | Chiesa et al. | 711/151 |
| 5,504,882 A | 4/1996 | Chai et al. | 714/5 |
| 5,517,615 A | 5/1996 | Sefidvash et al. | 714/5 |
| 5,530,913 A | 6/1996 | Scholefield | 455/450 |
| 5,548,711 A | 8/1996 | Brant et al. | 714/5 |
| 5,561,825 A | 10/1996 | Yamagami et al. | 710/58 |
| 5,606,679 A | 2/1997 | Cohn et al. | 711/4 |
| 5,640,530 A | 6/1997 | Beardsley et al. | 711/113 |
| 5,675,577 A | 10/1997 | Komatsu | 370/237 |
| 5,689,729 A | 11/1997 | Inoue | 710/52 |
| 5,720,028 A | 2/1998 | Matsumoto et al. | 714/9 |
| 5,802,547 A | 9/1998 | Legvold | 711/100 |
| 5,922,077 A | 7/1999 | Espy et al. | 714/7 |
| 5,953,511 A | * 9/1999 | Sescila, III et al. | 710/315 |
| 5,984,498 A | * 11/1999 | Lem et al. | 700/2 |
| 6,233,632 B1 | * 5/2001 | Meiyappan et al. | 710/66 |

OTHER PUBLICATIONS

U.S. Patent application Ser. No. 09/563,656, filed May 2, 2000, entitled "Method, System, and Program for Updating Firmware to a Storage System Comprised of Multiple Controllers".

U.S. Patent application Ser. No. 09/561,639, filed May 2, 2000, entitled "Method, System, Program and Structure for Selecting a Preferred Path to a Storage Device".

IBM, "IBM 7133 Serial Disk System Advanced Models D40 and T40", May 1999, G225–6798–02.

Mylex®, "SANArray™FFx", pp. 1–12.

SCSI, "SCSI–3 Primary Commands", Mar. 28, 1997, pp. 32–40.

* cited by examiner

Primary Examiner—Reba I. Elmore
(74) Attorney, Agent, or Firm—David W. Victor; Konrad Raynes Victor & Mann

(57) ABSTRACT

Disclosed is a method, system, program, and data structure for defining paths for a computer to use to send commands to execute with respect to storage regions in a storage device that are accessible through at least two controllers. For each storage region, one controller is designated as a preferred controller and another as a non-preferred controller. The computer initially sends a command to be executed with respect to a target storage region to the preferred controller for the target storage region and sends the command to the non-preferred controller for the target storage region if the preferred controller cannot execute the command against the target storage region. In response to the non-preferred controller receiving at least one command for the target storage region, the designation is modified to make a current preferred controller the non-preferred controller for the target storage region and a current non-preferred controller the preferred controller for the target storage region.

36 Claims, 7 Drawing Sheets

| Byte | Bit 7 | Bit 6 | Bit 5 | Bit 4 | Bit 3 | Bit 2 | Bit 1 | Bit 0 |
|---|---|---|---|---|---|---|---|---|
| 0-35 | Standard Inquiry Data ||||||||
| 36-43 | Unit Serial Number for LUN ||||||||
| 97 | | | | | | | | PrefPath |
| | | | | | | | | |

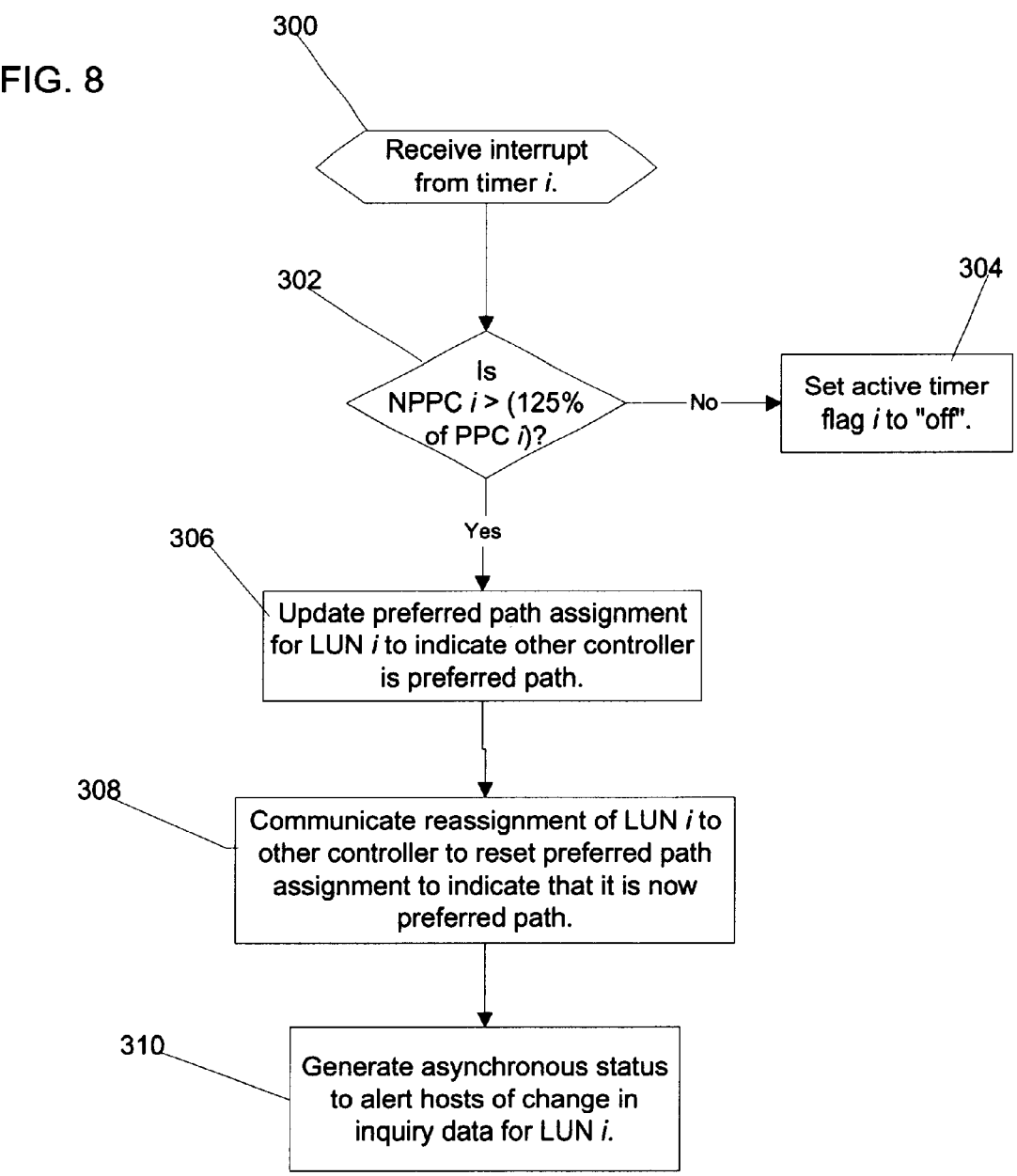

METHOD, SYSTEM, AND PROGRAM FOR MODIFYING PREFERRED PATH ASSIGNMENTS TO A STORAGE DEVICE

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, Program, and Data Structure For Selecting a Preferred Path to a Storage Device", to David A. Burton and Robert L. Morton, having Ser. No. 09/561,639, and "Method, System, and Program for Updating Firmware to a Storage System Comprised of Multiple Controllers", to David A. Burton and Robert L. Morton, having Ser. No. 09/563,656.

BACKGROUND OF THE INVENTION

1. Field of the Invention

The present invention relates to a system, method, and program for defining preferred paths for a computer to use to send commands to execute with respect to storage regions in a storage device that are accessible through at least two controllers.

2. Description of the Related Art

In prior art storage systems, one or more host computers access a storage space maintained in a storage device through a storage controller. In mass storage systems, the storage device may comprise one or more Direct Access Storage Devices (DASDs), comprised of interconnected hard disk drives. The storage controller manages the flow of data from host systems to DASDs. Host systems view the physical storage space as a partition of Logical Unit Numbers (LUNs). The hosts will submit input/output (I/O) commands to a particular LUN, and the storage controller will translate the target LUN to a physical storage area.

To avoid total system failure in the event that one system component fails, storage controller subsystems incorporate redundant hardware components. For instance, one typical prior art storage subsystem includes multiple storage controller processors to provide hosts multiple paths to the same DASD and LUNs. In the event that one storage controller path fails, the path to the other storage controller can be used to access the DASD.

In high end storage controllers, such as the International Business Machines Corporation (IBM) 3990 and Enterprise System Storage Server,** a host may send an input/output (I/O) command to any host or controller I/O adaptor in the subsystem and the I/O adaptor would then route the I/O to the controller handling the target LUN of that I/O operation. With such prior art high end systems, the host does not need to know the controller that is primarily managing a particular LUN because the controllers include the interface circuitry to route the I/O to the primary controller. Such solutions require expensive interface hardware that is not feasible for lower cost storage subsystems.

Lower cost storage subsystems also use two controllers, such as Small Computer System Interface (SCSI) or Fibre Channel controllers, that provide separate paths to the same DASD. However, such systems do not include the interface circuitry and added ports used in the higher end controllers that allow the controllers to route I/Os between the controllers. Instead, with the lower cost storage subsystems, the host will select a path to a storage controller for the I/O operation and could alternate between controllers to reach the LUN. The problem with the solution in the lower cost models is that the storage controllers need to communicate to coordinate the execution of I/O operations against the same LUN to ensure that data consistency is maintained, i.e., a controller with a later instance of data does not write to the same storage location as the other controller which includes an earlier instance of the data. Such cross-controller communications use high latency communication paths to coordinate I/O operations. These coordination activities can introduce significant overhead into the I/O execution process and adversely affect the response time for all I/O operations in the subsystem.

Another prior art solution involves adding a port to each of the controllers in the subsystem. Each added port is linked to the port on the other controller that receives the I/O commands. For instance, the subsystem may include controller 0 having ports A and B and controller 1 having ports C and D. Ports A and C are used for I/O operations and port B is linked to port C and port D is linked to port A. If one of the controllers fails, then the linked port on the other controller will pick up the I/O operation from the failed controller. For instance, if controller 0 fails, then port D on controller 1 will take the I/O from port A on controller 0. The disadvantages of this solution are the cost required for the extra ports used for failover situations and that the design addresses only controller failures. If there was a failure in the path upstream of the controller, such as at the hub or cable, then the host could never reach the controller port.

Thus, there is a need in the art for an improved mechanism for selecting the appropriate I/O path that reduces system overhead in processing I/O commands and provides for a failover and failback in the event of a failure along the path to one of the controllers.

SUMMARY OF THE PREFERRED EMBODIMENTS

To overcome the limitations in the prior art described above, preferred embodiments disclose a method, system, and program for defining paths for a computer to use to send commands to execute with respect to storage regions in a storage device that are accessible through at least two controllers. For each storage region, one controller is designated as a preferred controller and another as a non-preferred controller. The computer initially sends a command to be executed with respect to a target storage region to the preferred controller for the target storage region and sends the command to the non-preferred controller for the target storage region if the preferred controller cannot execute the command against the target storage region. In response to the non-preferred controller receiving at least one command for the target storage region, the designation is modified to make a current preferred controller the non-preferred controller for the target storage region and a current non-preferred controller the preferred controller for the target storage region.

In further embodiments, information is maintained on a number of commands sent to the preferred controller and non-preferred controller for one target storage region. A determination is made as to whether a non-preferred value related to a number of commands sent to the non-preferred controller for the target storage region exceeds a threshold with respect to a preferred value related to a number of commands sent to the preferred controller for the target storage region. The designation is modified for the target storage region if the threshold is exceeded.

In still further embodiments, the preferred and non-preferred values are incremented by a first value for each read command and a second value for each write command. Still further, the first value may be greater than the second value.

Preferred embodiments provide a methodology for assigning default paths through one of two storage controllers for hosts to use to access a storage region. A failure that occurs in the communication line or fabric between the host and controller, but not a failure in the preferred controller, may cause the host to direct commands for a storage region to the non-preferred controller. In such case, the non-preferred controller will have to communicate with the preferred controller to coordinate execution of the command against the target storage area. Such coordination activity can significantly increase processor overhead for the controllers, thereby degrading system performance.

To address this problem associated with a preferred path designation, preferred embodiments provide a mechanism for altering the preferred controller designation for a storage region if the hosts are tending to send commands for the storage region to the non-preferred controller. After switching the preferred controller designation, the controller will receive the commands as the preferred controller, where previously the controller was receiving the commands as the non-preferred controller. Once the controller is designated as the preferred controller, the controller can execute the commands against the storage region without communicating and coordinating with the other controller, thereby avoiding the performance degradation that necessarily results from such coordination activities.

BRIEF DESCRIPTION OF THE DRAWINGS

Referring now to the drawings in which like reference numbers represent corresponding parts throughout:

FIG. 8 illustrates logic implemented in the storage controllers to reassign the preferred path designation for storage regions in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
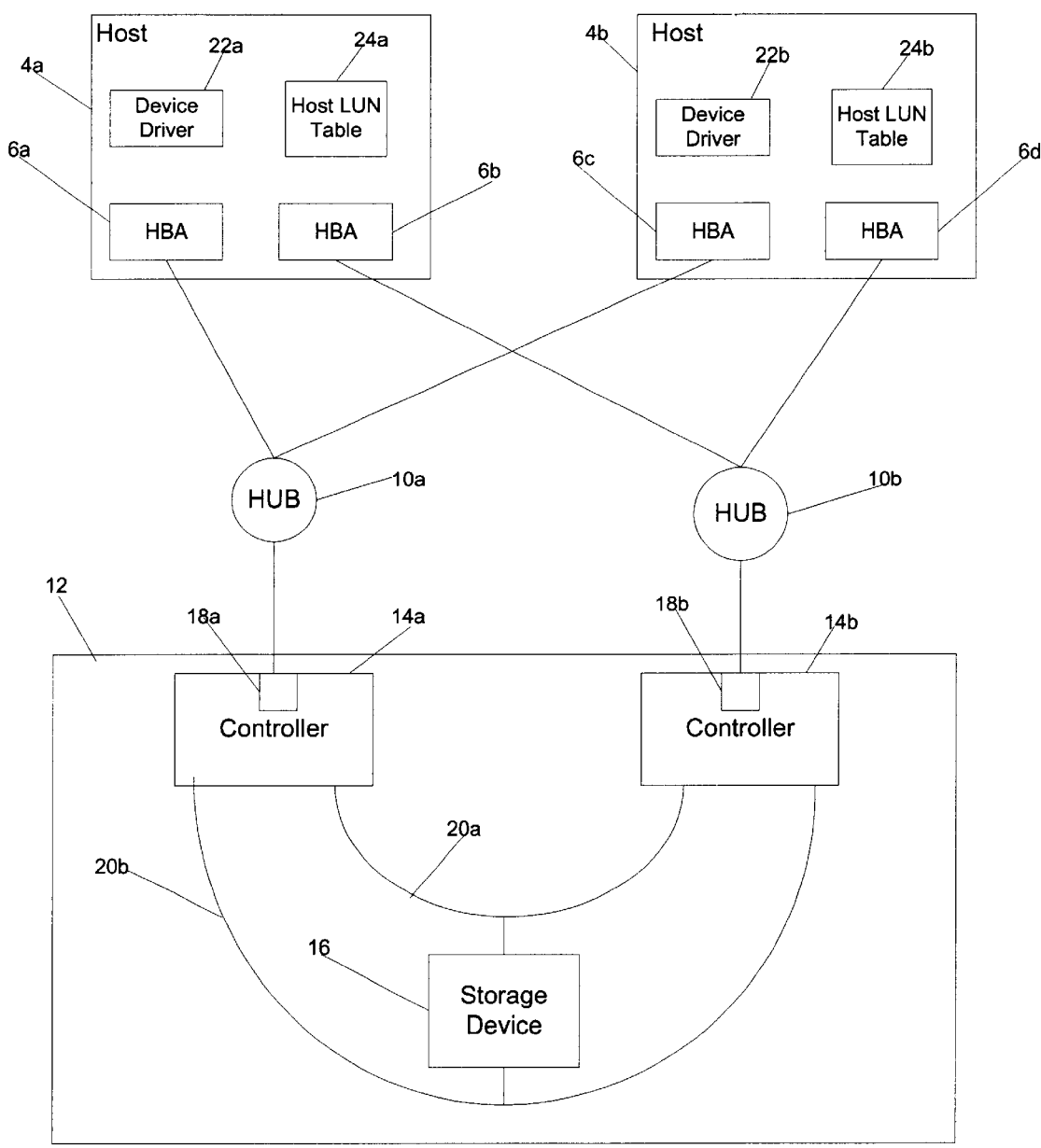
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include two host bus adaptors (HBAs) 6a, b and 6c, d, respectively. The HBAs 6a, b, c, d may comprise a Fibre Channel or Small Computer System Interface (SCSI) adaptor card or any other network adaptor card known in the art. The HBAs 6a, b, c, d allow the hosts 4a, b to communicate with storage controllers 14a, b via the hubs 10a, b. The hubs 10a, b may comprise the IBM Fibre Channel Storage Hub or Switch, the IBM SAN Fibre Channel Switch, or any other switching device known in the art. A storage subsystem 12 includes two controllers 14a, b that provide access to a storage device 16, such as a DASD. Each controller 14a, b includes at least one port 18a, b, respectively, through which a host 4a, b accesses the controller 14a, b. In preferred implementations, both controllers 14a, b can access any storage location in the storage device 16. The controllers 14a, b may comprise the IBM Fibre Channel Raid Storage Controller or any other storage controller known in the art that provides one or more hosts access to a single storage space or storage devices. Lines 20a, b provide communication from the controllers 14a, b to the storage device 16 such that either controller 14a, b can use the lines 20a, b to access any part of the storage device 16. The lines 20a, b may be implemented using the Fibre Channel interface. In such case, the controllers 14a, b would include Fibre Channel adaptors and the lines 20a, b would comprise cables connected to the controllers 14a, b to form Fibre Channel arbitrated loops (FCAL) to interconnect the controllers 14a, b to the storage device 16 components, e.g., hard disk drives.

In alternative embodiments, multiple hosts may connect to a single storage controller that provides access to a DASD. Storage subsystems that provide access to multiple hosts include high end storage controllers, such as the IBM 3990 and Enterprise Storage Server storage controller products, as well as others. Thus, the term "storage controller" or "controller" as used herein refers to any storage controller, storage server, control unit, or any other computing device that manages input/output (I/O) requests from multiple host systems.

Figures 2, 3:
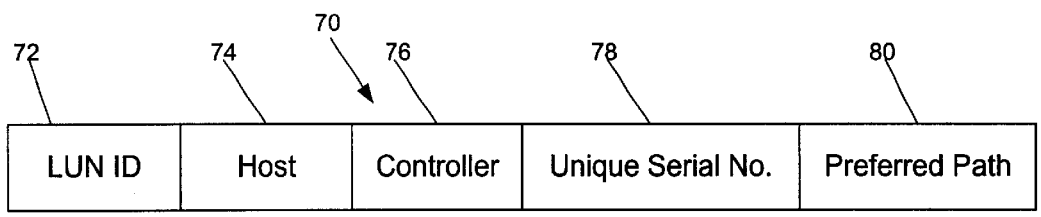
FIG. 2 illustrates the format of inquiry data in accordance with preferred embodiments of the present invention.
FIG. 3 illustrates an entry in a LUN path table in accordance with preferred embodiments of the present invention.

Preferred embodiments are implemented using the SCSI protocol. In such case, the controllers 14a, b would provide inquiry data for each LUN, including information concerning parameters of the controller 14a, b and the LUN. FIG. 2 illustrates inquiry data 50 in accordance with the preferred embodiments. Bytes 0 through 35 of the Inquiry data 50 includes the fields found in the inquiry data record described in the "SCSI 3 Primary Commands (SPC)", proposed draft T10/995D revision 11a, dated Mar. 28, 1997 (Copyright ANSI). Preferred embodiments add an eight byte unique serial number field 52, at bytes 36–43, that provides a world wide unique identifier of the LUN for which the inquiry data 50 is maintained. A preferred path field 54 in the inquiry data 50 indicates which controller 14a, b is the preferred target of I/O operations toward the LUN represented by the inquiry data 50. The preferred path assignment is maintained in configuration data.

During configuration, one of the controllers 14a or b would allocate the LUNs between the controllers 14a, b, where the controller 14a, b to which the LUN is allocated comprises the preferred path for that LUN. This allocation of LUNs to a preferred controller is maintained in configuration data indicating preferred and non-preferred controllers for each LUN. The allocation of LUNs to controllers 14a, b may be determined using a load balancing algorithm to assign LUNs to controllers 14a, b in a manner that evenly distributes the I/O processing load between controllers in order to prevent overburdening one of the controllers 14a, b with I/O operations. Alternative techniques may be used to allocate the LUNs to the controllers 14a, b, such as a user specified configuration, random assignment, etc. Preferably, the LUNs are allocated such that each controller 14a, b handles an equivalent number of I/O operations and total bytes accessed for the workloads expected on the LUNs. Each controller maintains the preferred path allocation of the LUNs in non-volatile storage to ensure that all hosts will have the same view of the preferred path for each LUN. When returning inquiry data to a host 4a, b, the controller 14a, b would use the configuration data indicating the preferred path assignment to update the preferred path field 54 of the inquiry data 50 to indicate the preferred path to the LUN. If the subsystem 12 includes two controllers 14a, b, then the preferred path field 54 may comprise one bit, where a zero indicates one controller and a one indicates the other. The controller 14a, b not identified in the preferred path field 54 would be the non-preferred controller.

Each host system 4a, b includes a device driver 22a, b which is used to select a path to use for the I/O operation. A controller path comprises the path from one host 4a, b to the hub 10a, b which connects to a particular controller 14a, b. During initialization, the device driver 22a, b builds a LUN path table 24a, b. FIG. 3 illustrates the fields in an entry 70 of the LUN path table 24a, b maintained in the hosts 4a, b. An entry 70 in the LUN path table 24a, b includes a LUN ID field 72 indicating a LUN number. A host field 74 and controller field 76 indicate a path from a host to a controller for which the entry 70 is maintained. The unique serial number field 78 indicates a unique identifier of the LUN, such as a world wide name. The unique serial number for the storage space is maintained because different hosts 4a, b may assign different LUN numbers to the same physical storage space. The preferred path field 80 indicates whether the host-to-controller path specified in fields 74 and 76 is the preferred path to the LUN, i.e., a boolean value indicating preferred path or not. With the information in the LUN path table, the host 4a, b can determine multiple paths to the same LUN using the different controllers 14a, b and whether a particular controller 14a, b identified in the entry is the preferred or non-preferred controller.

Figure 4:
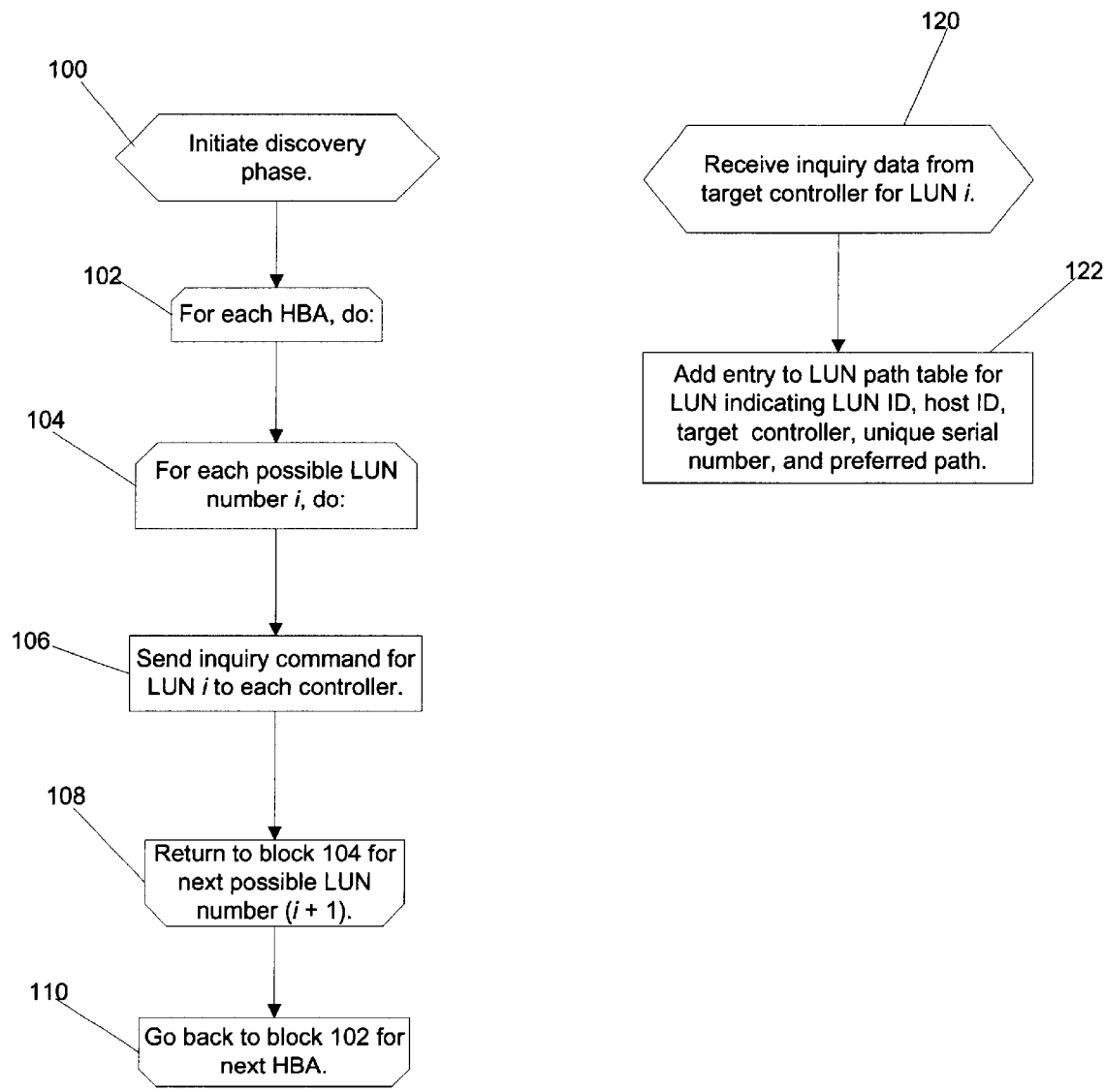
FIG. 4 illustrates logic implemented in a host device driver to build a LUN path table in accordance with preferred embodiments of the present invention.

FIG. 4 illustrates logic implemented in the host device driver 22a, b to build a LUN path table 24a, b indicating preferred path information for a path to a LUN during 4a, b host initialization. Control begins at block 100 with the device driver 22a, b initiating a discovery phase during initialization. The device driver 22a, b then performs a loop at block 102 to 110 for each host bus adaptor 6a, b and 6a, b, respectively, and then a loop at block 104 to 108 for each possible LUN number i. For each LUN number i, the device driver 22a, b sends (at block 104) an inquiry command, such as the SCSI inquiry command, for LUN number i to each controller 14a, b. At block 120, the host 4a, b receives the inquiry data 50 for a LUN number in response to the inquiry command sent at block 104. Upon receiving the inquiry data 50, the device driver 22a, b inserts an entry 70 in the LUN path table 24a, b indicating the LUN number in field 72; the host and controller ID information in fields 74 and 76, respectively, which specifies the path from the host to the controller; the unique serial number for the LUN in field 78; and whether the host-to-controller path is the preferred path in the preferred path field 80, i.e., the controller 14a, b identified in the controller field 76 is the preferred controller.

Figure 5:
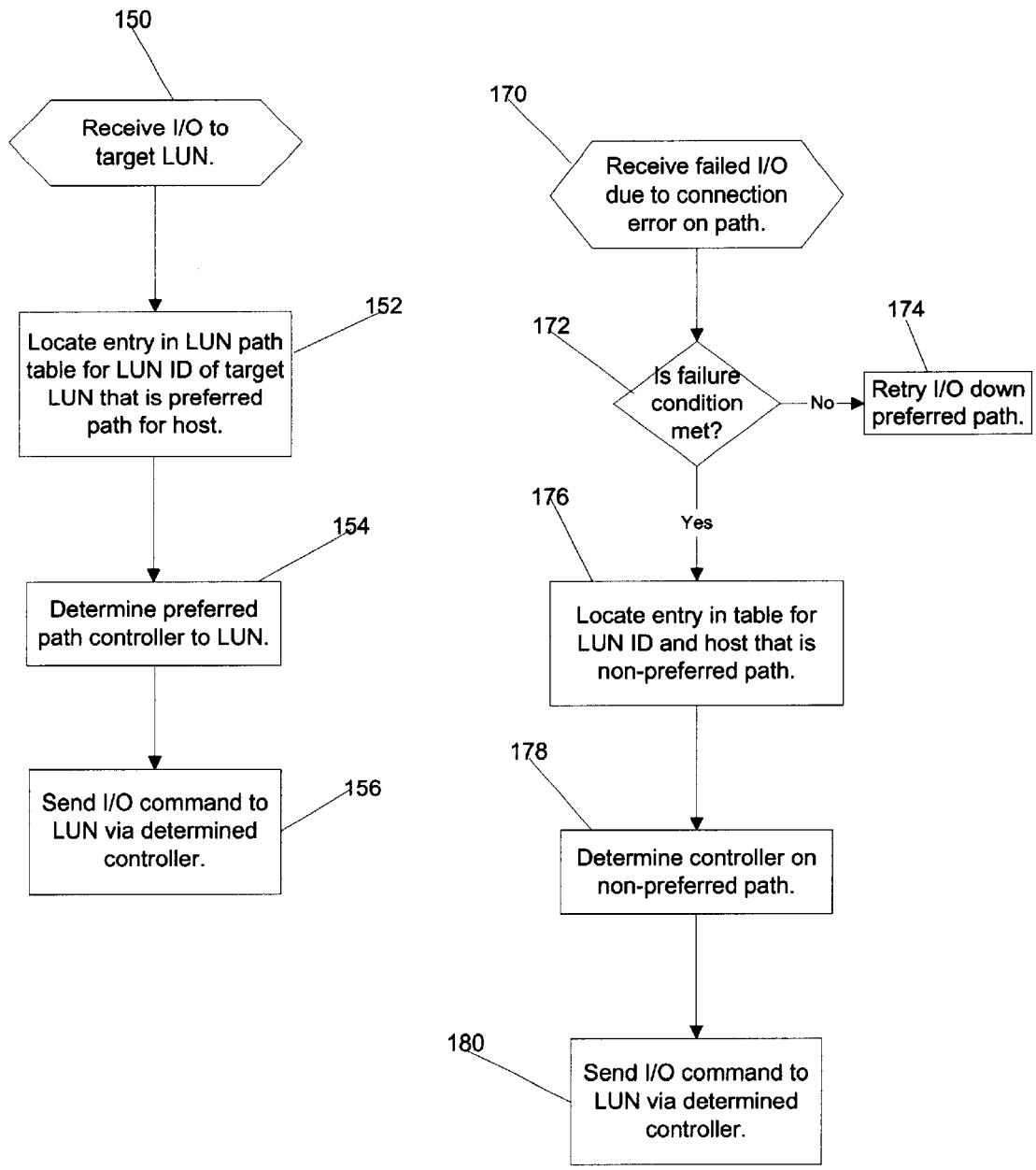
FIG. 5 illustrates logic implemented in a host device driver to select a path for an operation in accordance with preferred embodiments of the present invention.

FIG. 5 illustrates logic implemented in the host device drivers 22a, b to select a path to a controller 14a, b for an I/O operation. Control begins at block 150 with the device driver 22a, b receiving an I/O command to a target LUN. The device driver 22a, b will scan the LUN path table 24a, b to locate (at block 152) an entry for the preferred path (having the preferred path field 80 "on") for the target LUN ID having a host field 74 including the host ID of the initiator host driving the I/O operation The device driver 22a, b then determines (at block 154) from the controller field 76 the controller 14a, b that is the preferred controller, i.e., for the entry having the preferred path field 54 "on". The device driver 22a, b then sends (at block 156) the I/O command down the path to the determined controller 14a or b to execute.

If the host 4a, b receives a message indicating that an I/O failed at block 170, then the device driver 22a, b will check (at block 172) for a failure condition, e.g., whether there have already been the maximum number of consecutive failed retries for a given I/O command. If the failure condition is not met, then the device driver 22a, b will retry (at block 174) the I/O operation down the preferred path. Otherwise, the device driver 22a, b will locate (at block 176) an entry in the LUN path table 24a, b for the target LUN ID and initiating host having the non-preferred path. The device driver 22a, b will then determine (at block 178) the controller 14a or b for this entry (from the controller field 76) and send (at block 180) the I/O operation down the non-preferred path to the determined controller 14a or b.

Preferred embodiments provide modifications to the device driver 22a, b operations to build a LUN path table 24a, b indicating preferred paths to a particular LUN for the host 4a, b. The device driver 22a, b would then use this LUN path table 24a, b to select one of the controllers 14a, b for an I/O operation against a LUN which may be accessed through either controller 14a, b. By using a preferred controller, the host 4a, b reduces the need for the controllers 14a, b to cross-communicate to manage I/O operations to the same target LUN or storage device because the host 4a, b is directing all I/Os to only one of the storage controllers.

With preferred embodiments, after a certain number of failed attempts to complete the I/O operation, the host 4a, b will select the non-preferred controller. Thus a failure at any point in the path from the host 4a, b to the hubs 10a, b to the controllers 14a, b may result in the host 4a, b selecting an alternate, non-preferred controller that avoids the path to the controller containing the failure. At this point, selection of the non-preferred controller would require the controllers 14a, b to engage in the cross-communication, in a manner known in the art, to manage the execution of I/O commands against the same LUN, which may result in delays in I/O processing. However, the preferred technique minimizes any delays necessitated by cross-controller 14a, b management of I/Os to the same LUN because the preferred embodiments tend to always use the same path or one controller 14a, b for I/Os to a particular LUN unless there is a failure.

Preferred embodiments further improve load balancing of I/O processing between the controllers 14a, b because the controllers 14a, b use load balancing optimization to allocate LUN numbers to controllers 14a, b, and the hosts 4a, b uses this preferred controller, designated according to load balancing methods, to access the LUN.

Thus, preferred embodiments optimize I/O processing by using a preferred path to access the LUN selected according to load balancing optimization, and at the same time provide a mechanism for an alternative failback controller and path in the event there is a failure at any point in the path.

Still further, the preferred embodiments allow for load balancing, optimization of I/O processing, and failover and failback to a surviving controller for those lower cost subsystems that only include dedicated ports 18a, b on each controller 14a, b.

Modifying the Preferred Path Assignment

A situation may arise where the controllers 14a, b are operational but there is a failure in the fabric between the host 4a, b and subsystem 12, i.e., a failure in the communication line between a host 4a, b and a hub 10a, b or between a hub 4a, b and the storage subsystem 12. In such case, according to the logic of FIG. 5, the hosts 4a, b will use the non-preferred path. The continued use of non-preferred paths degrades subsystem 12 performance because the non-preferred controller 14a, b receiving the I/O must communicate with the preferred controller 14a, b to coordinate the execution of the command. Even after the preferred controller has completed executing all commands, the non-preferred controller will automatically communicate with the preferred controller even though the non-preferred controller is at this point receiving all I/Os from the host due to the fabric failure.

To eliminate the communication overhead and performance degradation that results from continually using the non-preferred path, preferred embodiments provide an algorithm for modifying the preferred path assignment, such that a non-preferred controller that is presently receiving most of the I/O command activity for a LUN will be redesignated the preferred controller. Once this reassignment occurs, the controller reassigned as the preferred controller will no longer have to communicate with the other controller to execute commands with respect to the LUN.

To perform the reassignment of the preferred path for a LUN, the controllers 14a, b both maintain counters and a timer for each LUN for which they are the preferred controller. A preferred path counter i (PPC i) is used to count commands received in a measured time period by the controller 14a or b for LUN i when the receiving controller is the preferred controller for LUN i. A non-preferred path counter i (NPPC i) is used to count commands in a measured time period by the controller 14a or b for LUN i when the receiving controller is the non-preferred controller for LUN i. Timer i comprises a timer maintained by the preferred controller 14a, b to measure the time period for LUN i during which the counters PPC and NPPC are measured. An active timer flag i indicates whether timer i has been activated for LUN i. In preferred embodiments, the counters, timers, and flags for a particular LUN i are maintained by the preferred controller for that LUN i.

Figure 6:
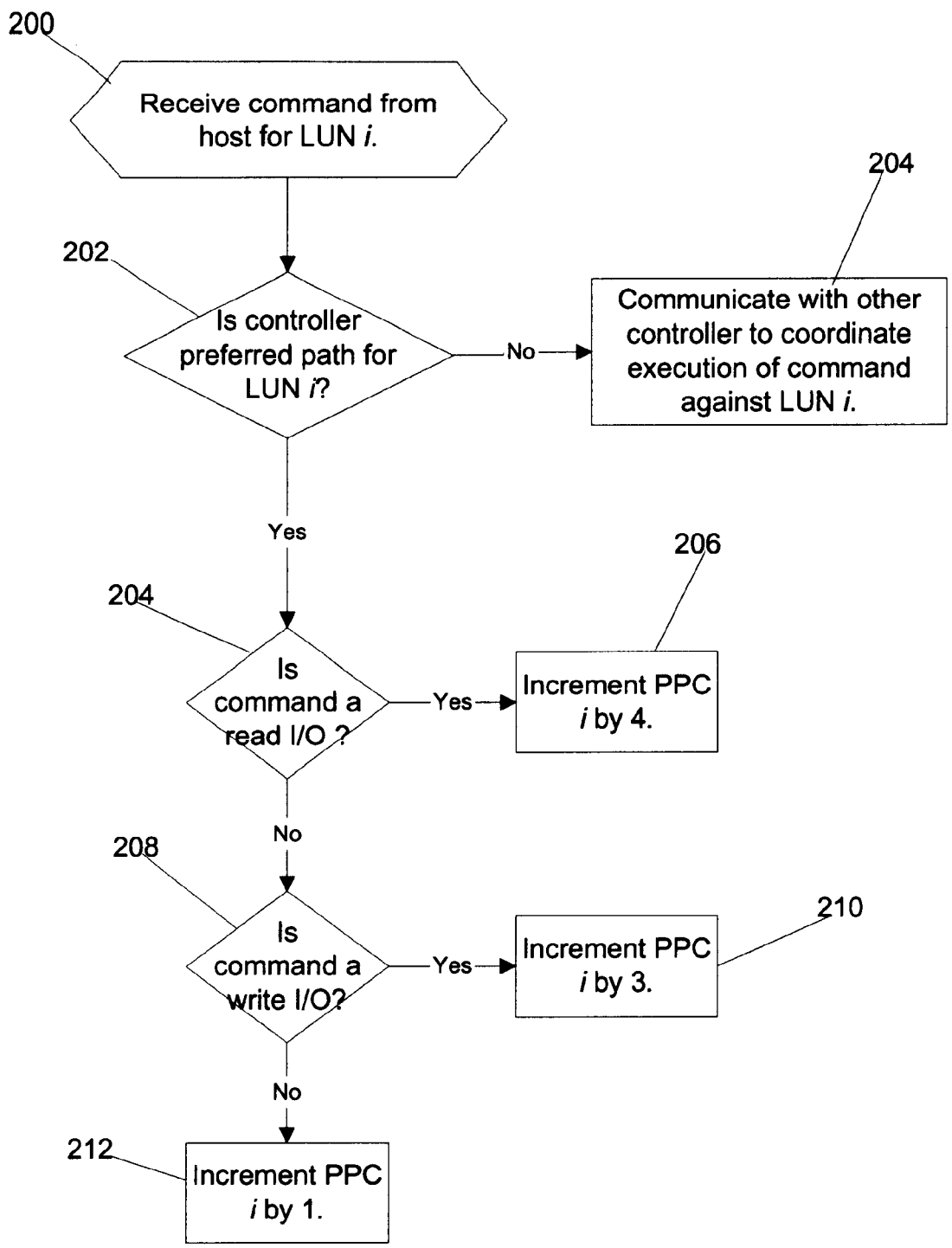
FIGS. 6 and 7 illustrates logic implemented in the storage controllers to process commands directed toward a storage region received from the host in accordance with preferred embodiments of the present invention.
Figure 7:
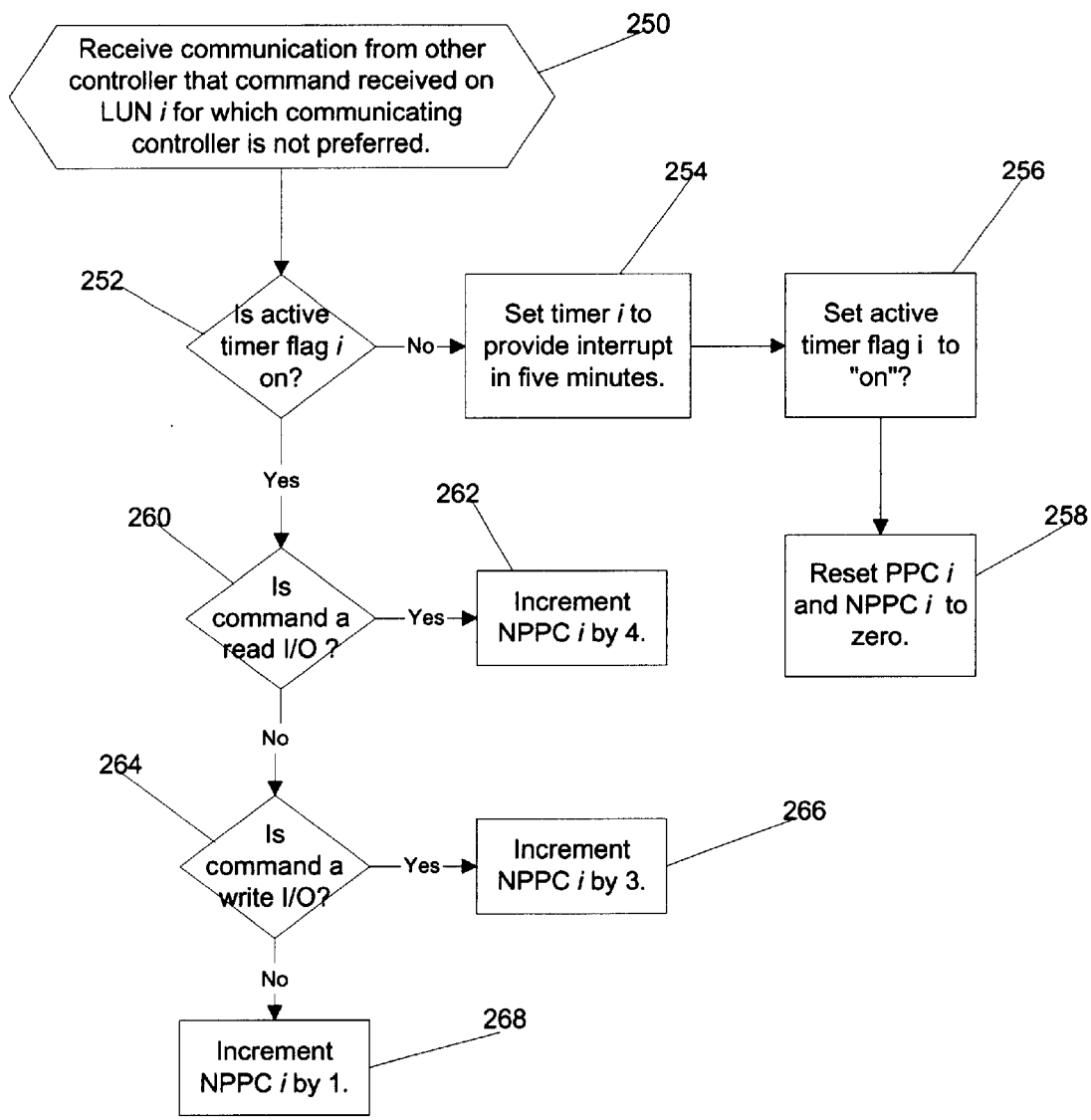

FIGS. 6–8 illustrate logic implemented by each controller 14a, b, either as software logic or embedded control logic, to use the above described counters, timers, and flags to determine whether to alter the preferred path assignment for a LUN in the controllers 14a, b. FIG. 6 illustrates logic implemented in the controllers 14a, b to initially handle a command, e.g., a read/write command or any other type of command, received (at block 200) from the hosts 4a, b with respect to LUN i maintained in the storage device 16. The receiving controller 14a, b, i.e., the controller 14a, b initially receiving the command, would then access the preferred path assignment maintained in the configuration data to determine (at block 202) whether it is the preferred path for LUN i. If not, then the receiving controller 14a, b, which is not the preferred controller, would communicate (at block 204) with the other controller to coordinate execution of the command against LUN i in a manner known in the art to avoid any conflicts and ensure data integrity.

If the receiving controller 14a, b is the preferred controller and the command is a read I/O (at block 204), then the controller 14a, b would increment the preferred path counter i for LUN i (PPC i) by four. If the I/O command is a write command to the preferred controller (at block 208), then the preferred path counter i for LUN i (PPC i) is incremented by three. If the command is not an I/O command, but some other command, such as a request for status or other information for LUN i, then the PPC i is incremented by one. Reads are weighted the heaviest because read performance degradation can delay the return of critical data to a host application, which can adversely affect the execution of application processing. Writes are weighted less than read I/Os because the host application program can continue processing even if its write request is not immediately applied to the storage device 16. Non-I/O commands have the lowest relative weighting as delays in processing such commands typically has the least affect on host application performance. In alternative embodiments, any alternative values may be selected for the read, write, and non-I/O command weights used to adjust the counters. The term "command" as used herein refers to any type of command, e.g., read, write, non-I/O, etc.

In the preferred embodiments, each controller 14a, b maintains the counters for those LUNs for which the controller 14a, b is the preferred path. FIG. 7 illustrates logic implemented in the controllers 14a, b to adjust the weights when the other controller receives a command against a LUN i for which it is not the preferred path. Control begins at block 250 with the preferred controller 14a, b for LUN i receiving a message from the other controller that the other controller 14a, b received a command for LUN i from a host 4a, b, i.e., the host communicated the command to the non-preferred controller.

If (at block 252) the active timer flag i for LUN i is off, which means that no previous command for LUN i was sent to the non-preferred controller, then the preferred controller 14a, b sets (at block 254) timer i for LUN i to "on" to provide an interrupt in five minutes, or any other selected time period. The active timer flag i for LUN i is also set (at block 256) "on" to indicate that the NNPC i and PPC i for LUN i are actively being adjusted. The preferred controller 14a, b further resets the PPC i and NPPC i counters to zero. At this point, the preferred controller 14a, b begins taking measurements to determine whether to modify the preferred path assignment for LUN i to the other controller 14a, b. If (at bock 252) the active timer i is "on", then if the command is a read I/O, the NPPC i is incremented by four; if the command is a write I/O, the NPPC i is incremented by three; and if the command is not an I/O, then the NPPC i is incremented by one.

With the logic of FIGS. 6 and 7, a controller 14a, b will keep track of the number of commands to a LUN i for which the controller 14a, b is the preferred path that are directed down the non-preferred and preferred paths for the time period of the timer i. FIG. 8 illustrates logic implemented in the controller 14a, b to use the counters in reassigning the preferred path for LUN i. Control begins at block 300 with a controller 14a, b receiving an interrupt from the timer i for LUN i for which the interrupted controller is the preferred controller. If (at block 302) the NPPC i is more than twenty-five percent greater than the PPC i, i.e., there have been 25% more commands directed to LUN i down the non-preferred path than the preferred path, then the controller 14a, b updates (at block 306) the preferred path assignment in the configuration data for LUN i to indicate that the other controller is the preferred path, thereby indicating that the interrupted controller 14a, b is no longer the preferred controller for LUN i. The interrupted controller 14a, b then communicates (at block 308) the change in preferred path status to the other controller 14a, b. In response, the other controller would update its preferred path assignment configuration data to indicate that it is now the preferred path for LUN i.

The interrupted controller 14a, b would further generate (at block 310) an asynchronous status to alert any host 4a, b initiating a command to the interrupted controller 14a, b indicating a change in the inquiry data for LUN i. This asynchronous status would cause the initiating host 4a, b to submit an inquiry command from all its host adaptors to obtain inquiry data for LUN i which would indicate the new preferred path assignment for the controllers 14a, b. Upon receiving the new inquiry data, the hosts 4a, b would then update the preferred path field 80 in the records 70 for LUN i in the host LUN table 24a, b to reflect the new preferred path assignment.

The result of the logic of FIGS. 6–8 is that if a controller 14a, b is receiving significantly more commands for a LUN i for which it is not the preferred path, then the preferred path assignment will change so that the controller 14a, b receiving the significant number of commands for LUN i will become the preferred controller. This reassignment avoids the delays resulting from communication overhead between the controllers to coordinate the execution of commands sent down the non-preferred path because the controller receiving most of the commands for the target LUN i is made the preferred controller.

CONCLUSION

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred embodiments, the storage subsystem 12 includes two controllers 14a, b and one port 18a, b on each controller. In further embodiments, the subsystem 12 may include more than two controllers and more than one port on each controller. Further, there may be more than one path from any one host to each controller.

The preferred logic of FIGS. 4–8 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

In preferred embodiments, the preferred path was reassigned if the NPPC was 25% greater than the PPC. In alternative embodiments, different percentages may be used to determine whether the number of commands sent down the non-preferred path have reached a threshold that necessitates a preferred path reassignment.

Preferred embodiments described particular counters, data structures and algorithms for measuring the point at which the preferred path should be reassigned. In alternative embodiments, different data structures and algorithms may be used to determine the point at which the preferred path should be reassigned to avoid communication delays resulting from commands for a LUN sent down the non-preferred path.

Preferred embodiments were described with respect to SCSI commands, such as the SCSI inquiry command used to obtain inquiry data from a SCSI server. In non-SCSI embodiments, different commands may be used to obtain the inquiry data for a LUN. In such case, the format of the inquiry data the controllers return may differ.

In summary, preferred embodiments disclose a method, system, and program for defining paths for a computer to use to send commands to execute with respect to storage regions in a storage device that are accessible through at least two controllers. For each storage region, one controller is designated as a preferred controller and another as a non-preferred controller. The computer initially sends a command to be executed with respect to a target storage region to the preferred controller for the target storage region and sends the command to the non-preferred controller for the target storage region if the preferred controller cannot execute the command against the target storage region. In response to the non-preferred controller receiving at least one command for the target storage region, the designation is modified to make a current preferred controller the non-preferred controller for the target storage region and a current non-preferred controller the preferred controller for the target storage region.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

Windows and NT are registered trademarks of Microsoft Corporation; AIX and OS/390 are registered trademarks of IBM and MVS and Fibre Channel Raid Storage Controller are trademarks of IBM.

What is claimed is:

1. A method for defining paths for a computer to use to send commands to execute with respect to storage regions in a storage device accessible through at least two controllers, comprising:

designating one controller as a preferred controller and another as a non-preferred controller for each storage region, wherein a computer initially sends a command to be executed with respect to a target storage region to the preferred controller for the target storage region and sends the command to the non-preferred controller for the target storage region if the preferred controller cannot execute the command against the target storage region;

receiving at least one command at the non-preferred controller for the target storage region; and modifying the designation to make a current preferred controller the non-preferred controller for the target storage region and a current non-preferred controller the preferred controller for the target storage region in response to receiving the at least one command at the non-preferred controller for the target storage region.

2. The method of claim 1, further comprising:

encoding information of the preferred and non-preferred controller designations and modifications to the designations for the target storage region into path information; and returning the encoded path information to a requesting computer, wherein the requesting computer uses the path information to initially send the command to the preferred controller for the target storage region and sends the command to the non-preferred controller for the target storage region if the preferred controller cannot execute the command.

3. The method of claim 1, further comprising:

maintaining information on a number of commands sent to the preferred controller and non-preferred controller for one target storage region; and determining whether a non-preferred value related to a number and type of commands sent to the non-preferred controller for the target storage region exceeds a threshold with respect to a preferred value related to a number of commands sent to the preferred controller for the target storage region, wherein the designation is modified for the target storage region if the threshold is exceeded.

4. The method of claim 3, further comprising starting a timer for the target storage region, wherein the determination of whether the threshold is exceeded is made after the timer expires.

5. The method of claim 4, wherein the timer is started after the non-preferred controller for the target storage region receives a first command after the timer has expired or the non-preferred controller for the target store region receives the first command.

6. The method of claim 3, further comprising:

incrementing the preferred and non-preferred values by a first value for each read command and a second value for each write command.

7. The method of claim 6, wherein the first and second values are different.

8. The method of claim 7, wherein the first value is greater than the second value.

9. The method of claim 6, further comprising incrementing the preferred and non-preferred values by a third value for a command to be executed against the target storage region that is not a read or write command.

10. The method of claim 9, wherein the third value is less than the first and second values.

11. The method of claim 3, wherein the preferred controller maintains the preferred and non-preferred values for each target storage region.

12. The method of claim 11, further comprising:

communicating, from the non-preferred controller to the preferred controller for the target storage region, information on commands sent to the non-preferred controller for the target region, wherein the preferred controller uses the communicated information to adjust the non-preferred value for the storage region.

13. A system for defining paths for a computer, comprising:

at least two controllers;

a storage device including storage regions, wherein the storage regions are accessible through the at least two controllers;

means for designating one controller as a preferred controller and another as a non-preferred controller for each storage region, wherein a computer initially sends a command to be executed with respect to a target storage region to the preferred controller for the target storage region and sends the command to the non-preferred controller for the target storage region if the preferred controller cannot execute the command against the target storage region;

means for receiving at least one command at the non-preferred controller for the target storage region; and means for modifying the designation to make a current preferred controller the non-preferred controller for the target storage region and a current non-preferred controller the preferred controller for the target storage region in response to receiving the at least one command at the non-preferred controller for the target storage region.

14. The system of claim 13, further comprising:

means for encoding information of the preferred and non-preferred controller designations and modifications to the designations for the target storage region into path information; and means for returning the encoded path information to a requesting computer, wherein the requesting computer uses the path information to initially send the command to the preferred controller for the target storage region and sends the command to the non-preferred controller for the target storage region if the preferred controller cannot execute the command.

15. The system of claim 13, further comprising:

means for maintaining information on a number of commands sent to the preferred controller and non-preferred controller for one target storage region; and means for determining whether a non-preferred value related to a number and type of commands sent to the non-preferred controller for the target storage region exceeds a threshold with respect to a preferred value related to a number of commands sent to the preferred controller for the target storage region, wherein the designation is modified for the target storage region if the threshold is exceeded.

16. The system of claim 15, further comprising means for starting a timer for the target storage region, wherein the determination of whether the threshold is exceeded is made after the timer expires.

17. The system of claim 16, wherein the timer is started after the non-preferred controller for the target storage region receives a first command after the timer has expired or the non-preferred controller for the target store region receives the first command.

18. The system of claim 15, further comprising:

means for incrementing the preferred and non-preferred values by a first value for each read command and a second value for each write command.

19. The system of claim 18, wherein the first and second values are different.

20. The system of claim 19, wherein the first value is greater than the second value.

21. The system of claim 18, further comprising means for incrementing the preferred and non-preferred values by a third value for a command to be executed against the target storage region that is not a read or write command.

22. The system of claim 21, wherein the third value is less than the first and second values.

23. The system of claim 15, wherein the preferred controller maintains the preferred and non-preferred values for each target storage region.

24. The system of claim 23, further comprising:

means for communicating, from the non-preferred controller to the preferred controller for the target storage region, information on commands sent to the non-preferred controller for the target region, wherein the preferred controller uses the communicated information to adjust the non-preferred value for the storage region.

25. An information bearing for defining paths for a computer to use to send commands to execute with respect to storage regions in a storage device accessible through at least two controllers, wherein the information bearing medium includes code capable of causing one of the at least two controllers to perform:

designating one controller as a preferred controller and another as a non-preferred controller for each storage region, wherein a computer initially sends a command to be executed with respect to a target storage region to the preferred controller for the target storage region and sends the command to the non-preferred controller for the target storage region if the preferred controller cannot execute the command against the target storage region;

receiving at least one command at the non-preferred controller for the target storage region; and modifying the designation to make a current preferred controller the non-preferred controller for the target storage region and a current non-preferred controller the preferred controller for the target storage region in response to receiving the at least one command at the non-preferred controller for the target storage region.

26. The information bearing medium of claim 25, wherein the code is further capable of causing one of the at least two controllers to perform:

encoding information of the preferred and non-preferred controller designations and modifications to the designations for the target storage region into path information; and returning the encoded path information to a requesting computer, wherein the requesting computer uses the path information to initially send the command to the preferred controller for the target storage region and sends the command to the non-preferred controller for the target storage region if the preferred controller cannot execute the command.

27. The information bearing medium of claim 25, wherein the code is further capable of causing one of the at least two controllers to perform:

maintaining information on a number of commands sent to the preferred controller and non-preferred controller for one target storage region; and determining whether a non-preferred value related to a number and type of commands sent to the non-preferred controller for the target storage region exceeds a threshold with respect to a preferred value related to a number of commands sent to the preferred controller for the target storage region, wherein the designation is modified for the target storage region if the threshold is exceeded.

28. The information bearing medium of claim 27, wherein the code is further capable of causing one of the at least two controllers to perform starting a timer for the target storage region, wherein the determination of whether the threshold is exceeded is made after the timer expires.

29. The information bearing medium of claim 25, wherein the timer is started after the non-preferred controller for the target storage region receives a first command after the timer has expired or the non-preferred controller for the target store region receives the first command.

30. The information bearing medium of claim 25, wherein the code is further capable of causing one of the at least two controllers to perform:

incrementing the preferred and non-preferred values by a first value for each read command and a second value for each write command.

31. The information bearing medium of claim 30, wherein the first and second values are different.

32. The information bearing medium of claim 31, wherein the first value is greater than the second value.

33. The information bearing medium of claim 30, wherein the code is further capable of causing one of the at least two controllers to perform incrementing the preferred and non-preferred values by a third value for a command to be executed against the target storage region that is not a read or write command.

34. The information bearing medium of claim 33, wherein the third value is less than the first and second values.

35. The information bearing medium of claim 27, wherein the preferred controller maintains the preferred and non-preferred values for each target storage region.

36. The information bearing medium of claim 35, wherein the code is further capable of causing one of the at least two controllers to perform:

communicating, from the non-preferred controller to the preferred controller for the target storage region, information on commands sent to the non-preferred controller for the target region, wherein the preferred controller uses the communicated information to adjust the non-preferred value for the storage region.

* * * * *

UNITED STATES PATENT AND TRADEMARK OFFICE
CERTIFICATE OF CORRECTION

PATENT NO. : 6,393,535 B1
DATED : May 21, 2002
INVENTOR(S) : David Alan Burton and Robert Louis Morton It is certified that error appears in the above-identified patent and that said Letters Patent is hereby corrected as shown below:

Column 13,
Line 20, insert -- medium -- after "bearing".

Signed and Sealed this

Twenty-seventh Day of September, 2005

JON W. DUDAS
*Director of the United States Patent and Trademark Office*